United States Patent

Drake

[15] 3,667,144

[45] June 6, 1972

[54] SCHEDULE DISPLAY DEVICE

[72] Inventor: Edward E. Drake, Tulsa, Okla.

[73] Assignee: LVO Cable, Inc., Tulsa, Okla.

[22] Filed: Dec. 15, 1969

[21] Appl. No.: 884,915

[52] U.S. Cl. ....40/82

[51] Int. Cl. ....G09f 11/29

[58] Field of Search ....40/32, 30, 31, 78, 88, 89, 40/117, 107, 112, 82–86

[56] References Cited

UNITED STATES PATENTS

| | | | |
|---|---|---|---|
| 2,116,507 | 5/1938 | Colin | 40/31 |
| 265,855 | 10/1882 | Nelson et al. | 40/82 X |
| 2,012,257 | 8/1935 | Burch | 40/82 |
| 1,759,409 | 5/1930 | Lassiter | 40/82 |
| 2,070,486 | 2/1937 | Leyen | 40/82 |

*Primary Examiner*—Robert W. Michell
*Assistant Examiner*—J. H. Wolff
*Attorney*—Head & Johnson

[57] ABSTRACT

This invention relates to a schedule display device. More particularly, the invention relates to a device for displaying a schedule, such as a television program schedule, printed on a strip of rolled paper, the device including a housing having a window, means within the housing for rotatably supporting the roll of paper, a horizontal drive roller supported in the housing adjacent the window, means of rotating the drive roller, and means of contacting the paper with the drive roller for advancing the paper past the window.

3 Claims, 5 Drawing Figures

INVENTOR.
EDWARD E. DRAKE
BY Head & Johnson
ATTORNEYS

INVENTOR.
EDWARD E. DRAKE
BY Head & Johnson
ATTORNEYS

SCHEDULE DISPLAY DEVICE

CROSS REFERENCE

This disclosure is not related to any pending United States or foreign patent application.

BACKGROUND AND OBJECTS OF THE INVENTION

This invention will be described as it is particularly adapted to display a television schedule, it being understood that the application to display a television schedule is only an example of one use of the invention. Schedules of television programs are published in most daily newspapers and some magazines are devoted to providing program schedules. Such published notices serve to apprise the viewer of the schedule of programs to appear on television but have certain problems and disadvantages. The primary problem is that a viewer must locate the newspaper or magazine, find the page on which the schedule for that given day is printed and then examine the schedule to determine the program sequence.

This invention provides a device, suitable for mounting on or adjacent to a television set, for providing a ready display of scheduled television programs.

More particularly, an object of this invention is to provide a device for displaying a schedule, such as a television schedule, the device being of small, compact size, and readily mounted on or adjacent to a television set, for apprising the viewer of the schedule of television programs.

Another and more specific object of this invention is to provide a small, compact and inexpensive device adaptable to receive a printed television program schedule on a strip of paper in rolled form, the device serving to advance the strip of paper past a display window to display current television program scheduling.

These general objects as well as more specific objects of the invention will be understood by reference to the description and claims, taken in conjunction with the attached drawings.

DESCRIPTION OF THE VIEWS

DETAILED DESCRIPTION

Figures 1, 3, 4:
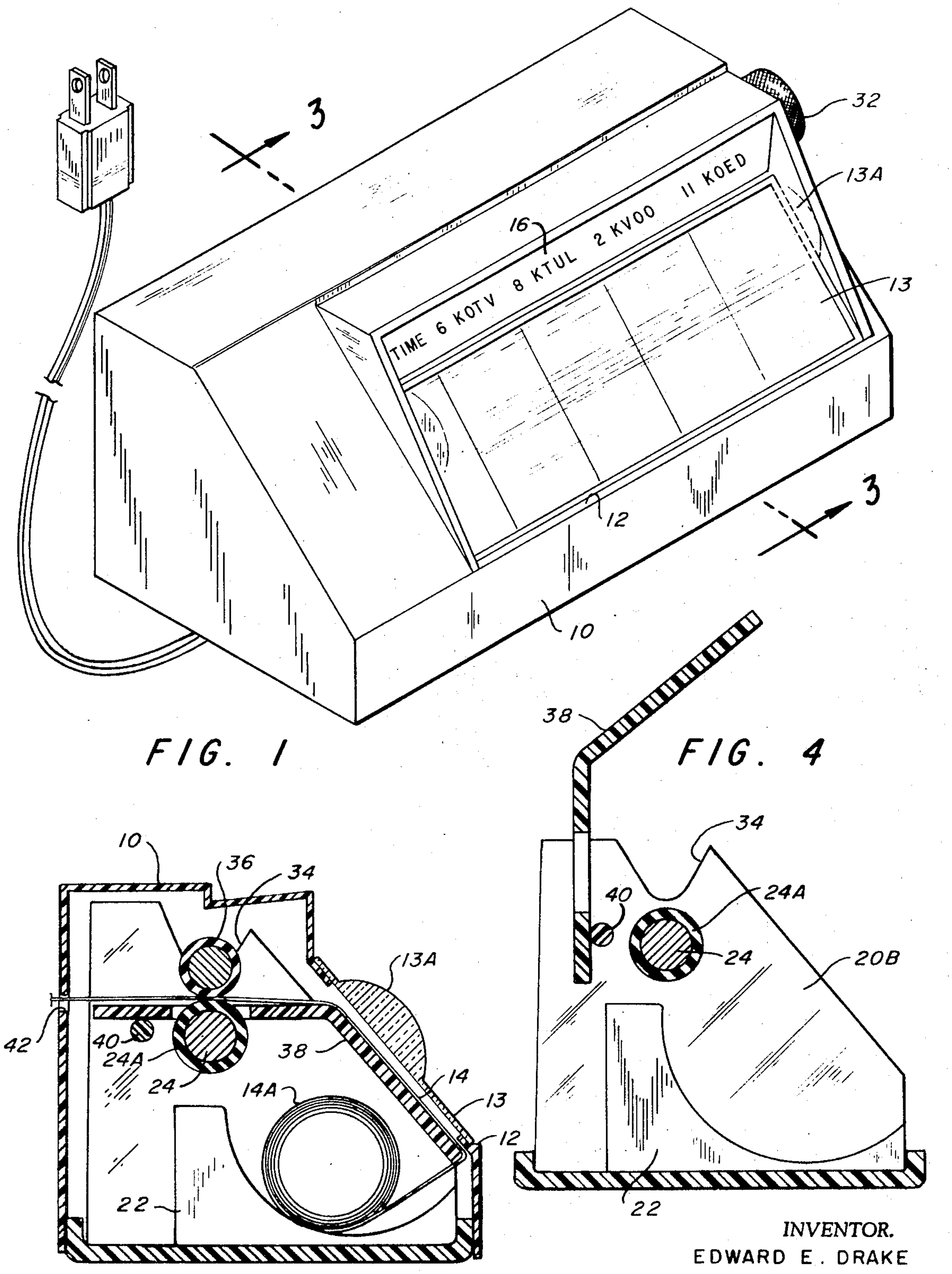
FIG. 1 is an isometric view of an embodiment of the schedule display device of this invention.
FIG. 3 is a cross-sectional view taken along the line 3—3 of FIG. 1.
FIG. 4 is a cross-sectional view as shown in FIG. 3, but with the cover removed and with the display plate shown pivoted in the upright position to receive thereunder a roll of schedule bearing paper.
Figure 2:
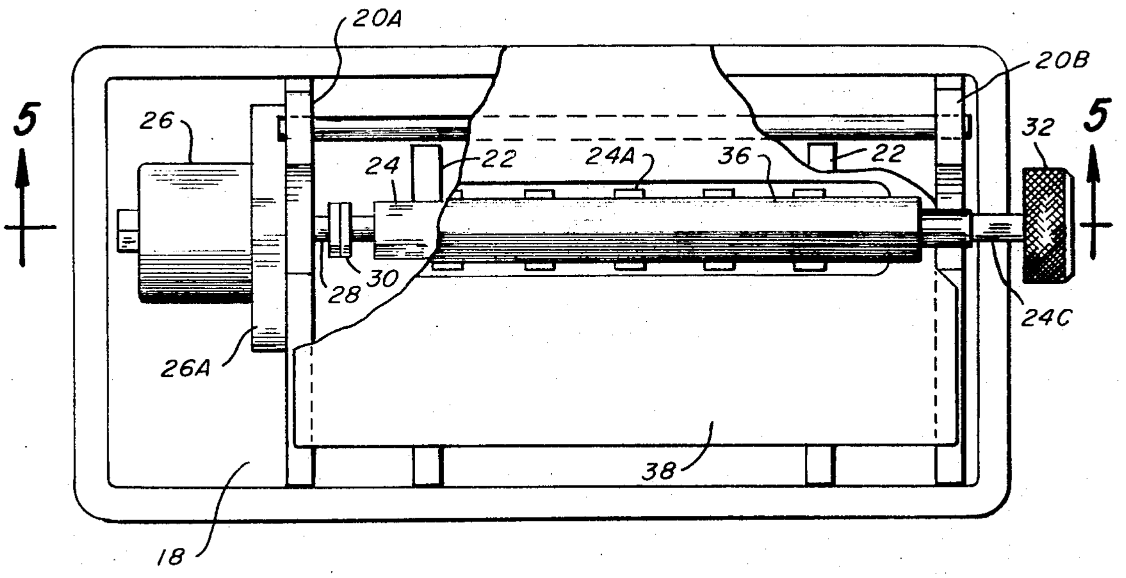
FIG. 2 is a top view of the schedule display device with the cover removed.
Figure 5:
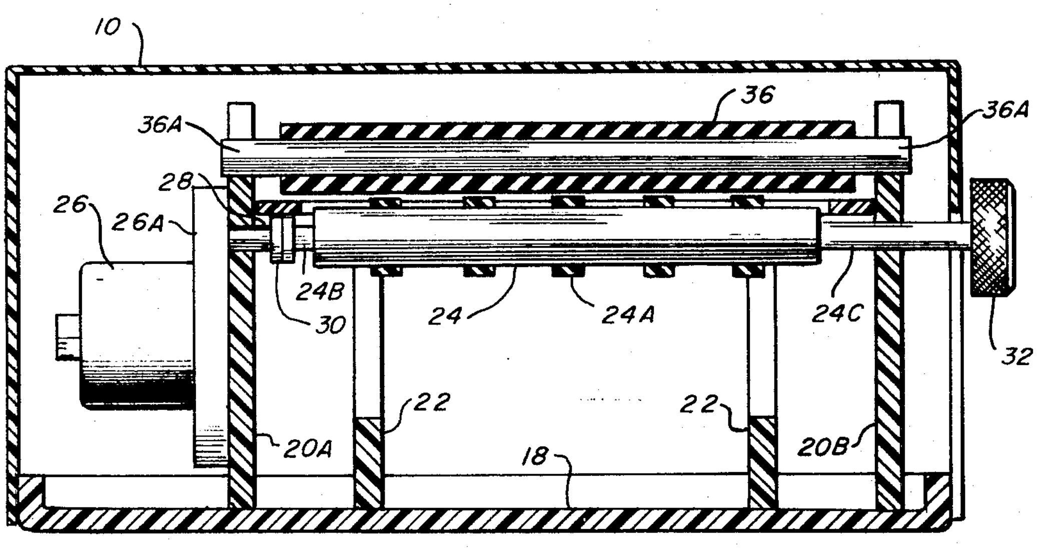
FIG. 5 is a cross-sectional view taken along the line 5—5 of FIG. 2.

Referring to FIG. 1, an embodiment of this invention is depicted, it being understood that the invention is not limited to the external appearance of the apparatus shown which may vary in great detail. The device is encompassed within a housing 10 which has a display window 12 therein. The window 12 includes a transparent glass or plastic cover 13. The cover 13 is shown to include integrally therewith magnifying lens portion 13A. The use of a glass 13, and particularly the inclusion of a lens portion 13A, is not mandatory. Below the display window is a strip of paper 14 (see FIG. 3) which has thereon a printed schedule, in this instance a schedule of television programs. Typically the paper 14 includes information of programs displayed by various television broadcasting stations or cable television stations, identified by a plate 16 extending across the top and above window 12.

The apparatus of the invention provides means for movement of the paper 14 so that a viewer may readily ascertain the television programs available at the current time.

Referring to FIGS. 2, 3, 4 and 5, the details of the invention are shown. The device includes a base 18 which supports two paralleled, spaced apart, upstanding bracket members 20A and 20B. Between the bracket members 20A and 20B the strip of schedule bearing paper 14, in the form of a roll 14A, is positioned (see FIG. 3). Roll 14A is in the form of a loose roll, not having a center element about which it is wound. To facilitate receiving the roll of paper 14A paper support feet 22 are provided each having a downwardly concaved surface on which the roll is supported and is freely rotatable.

Extending between the bracket members 20A and 20B is a drive roller 24 having a resilient exterior surface 24A. The drive roller includes extending axis portions 24B and 24C.

Affixed to bracket plate 20A on the side thereof opposite that which receives paper roll 14A, is an electric motor 26 including a speed reducer gear train portion 26A. The gear train portion 26A includes an output shaft 28 which is connected to shaft portion 24B of drive roller 24. In the illustrated arrangement of FIGURE 2 a small slip clutch means 30 is interposed between shaft 28 and shaft 24B. The inclusion of slip clutch means 30 is optional as will be explained subsequently.

Shaft portion 24C of drive rollers 24, that is, the end opposite motor 26, extends externally of housing 10 and has a knob 32 thereon for purposes to be described subsequently. Extension of shaft 24B externally of the housing and knob 32 are likewise optional embodiments.

The bracket members 20A and 20B each have, in a common plane, a vertical slot 34, the slots 34 being generally above the drive roller 24. Rotatably supported above the drive roller 24 is a contacting roller 36. Roller 36 includes a shaft extension portion 36A at each end which is received in a slot 34. Paper 14 extends between drive roller 24 and contacting roller 36, the function of contacting roller 36 being to urge the paper into sufficient frictional engagement with drive roller 24 so that as the roller is rotated the paper is advanced.

Supported between the upstanding bracket members is a display plate 38. A rod 40 extends rotatably between the bracket members 20A and 20B and has affixed to it one edge of the display plate 38. As shown in FIGURE 3 paper 14 extends from roll 14A over the display plate 38 and between drive roller 24 and contacting roller 36. A slot 42 in the rearward side of housing 10 permits paper 12 to be expelled externally of the housing after it has passed window 12.

The display plate 38 pivots upwardly, as shown in FIG. 4, to permit the placement of paper roll 14A in the bottom of the housing. After paper roll 14A is in position the display plate 38 is pivoted back to its normal position as shown in FIG. 3 and the paper inserted between rollers 24 and 36.

OPERATION

With paper roll 14A in position in the lower portion of the housing and the paper 14 extended over the display plate 38 and between drive roller 24 and contacting roller 36, the apparatus is ready for operation. In the most advanced embodiment of the invention utilizing motor 26 and gear train portion 26A the apparatus functions automatically to continuously move paper 12 so that the current television programming is displayed through window 12.

When one roll of paper 14 has been utilized the housing 10 is removed, the contacting roller 36 is lifted upwardly out of slots 34, the display plate 38 is pivoted upwardly to the position shown in FIG. 4, and a new roll of paper 14A is positioned between the bracket members 20A and 20B. The display plate 38 is then pivoted downwardly to its position shown in FIG. 3, the forward edge of the paper 14 is placed over the top of drive roller 24 and the contacting roller 36 is positioned back so that the shaft extending ends thereof are received within slots 34. In this arrangement the weight of contacting roller 36 forces paper 14 with sufficient pressure against drive roller 34 so that the paper is advanced as the drive roller rotates. It can be seen that many alternate arrangements may be employed, including the use of springs and otherwise, to urge contacting roller 36 against the paper and thereby the paper against drive roller 24.

If some discrepancy exists between the speed of rotation of drive roller 24 and the printing on paper 14 so that the proper time period is not shown in display window 12 the situation can easily be corrected by manually rotating knob 32 which rotates drive roller 24. Manual rotation of drive roller can take place because of the slip clutch 30 permitting rotation of the drive roller relative to the gear reducer output shaft 28. It can be seen that the use of the slip clutch 30, the portion of shaft 24B extending externally of the housing, and knob 32 are all optional and that the time sequence can be corrected without these features merely by pulling outwardly on the papers extending rearwardly of the housing if the paper needs to be advanced, and if it needs to be retarded, the housing can be removed and the paper pulled backwardly and rolled back upon roll 14A to put it into proper sequence.

In another embodiment the invention may be practiced without the use of motor 26 and gear reducer portion 26A. In such case the user rotates knob 32 manually when he wishes to advance the schedule paper 14. In a typical arrangement the display window 12 will normally be sufficient in height so that the program scheduled for a three or four hour period is disclosed. Thus the user need only turn knob 36 to advance paper 14 to the point where the earliest schedule desired is near the top of window 12 and a schedule for the subsequent two, three, or four hour period is shown without requiring the knob to be further rotated. The advantages of the manual arrangement is that the expense of the apparatus is greatly reduced by the elimination of motor 26 and gear reducer portion 26A.

The embodiment incorporating motor 26 is desirable from the standpoint that, with proper coordination of the spaced relationship of the program schedule with the rate of rotation of the drive shaft 24, the current schedule will always be available from the time the paper is first inserted until a complete roll 14A is utilized. While the length of schedule contained on a roll of paper 14A may vary considerably the average arrangement will include scheduling covering a period from 1 week to 4 weeks, with a 2 weeks schedule being typical.

The invention has been described with a great deal of particularity, however, it is manifest that many changes may be made in the details of construction and the arrangement of components without departing from the spirit and scope of this disclosure. It is understood that the invention is not limited to the embodiment described herein but is limited only by the scope of the attached claim or claims, including the full range of equivalency to which each element or step thereof is entitled.

What is claimed is:

1. A schedule display device comprising:
a housing having a window therein;
means within said housing for rotatably supporting a roll of schedule bearing paper;
a horizontal drive roller supported within said housing;
means of rotating said drive roller;
a horizontal contacting roller positioned parallel to said drive roller and biased towards said drive roller, said schedule bearing paper being received between said drive roller and said horizontal contacting roller; and
a display plate pivotally supported in said housing, said display plate being beneath, paralleled to, and spaced from said window in said housing, said display plate adaptable to receive schedule bearing paper thereover and to support such schedule bearing paper for viewing through said window, said display plate being pivotal to permit insertion of a roll of schedule bearing paper thereunder.

2. A schedule display device according to claim 1 wherein said contacting roller is freely downwardly supported above said drive roller, and wherein the weight of said contacting roller biases it towards said drive roller.

3. A schedule display device according to claim 1 including:
spaced apart, paralleled upstanding bracket members supported within said housing, said bracket members each having, in a common plane parallel the axis of said drive roller and above said drive roller, slots therein and wherein said contacting roller is rotatably received in said slots, the weight of the contacting roller biasing it downwardly towards said drive roller.

* * * * *